F. E. GROSVOLD.
BALL VALVE FOR CLOSET TANKS.
APPLICATION FILED JUNE 3, 1919.
1,377,883.
Patented May 10, 1921.
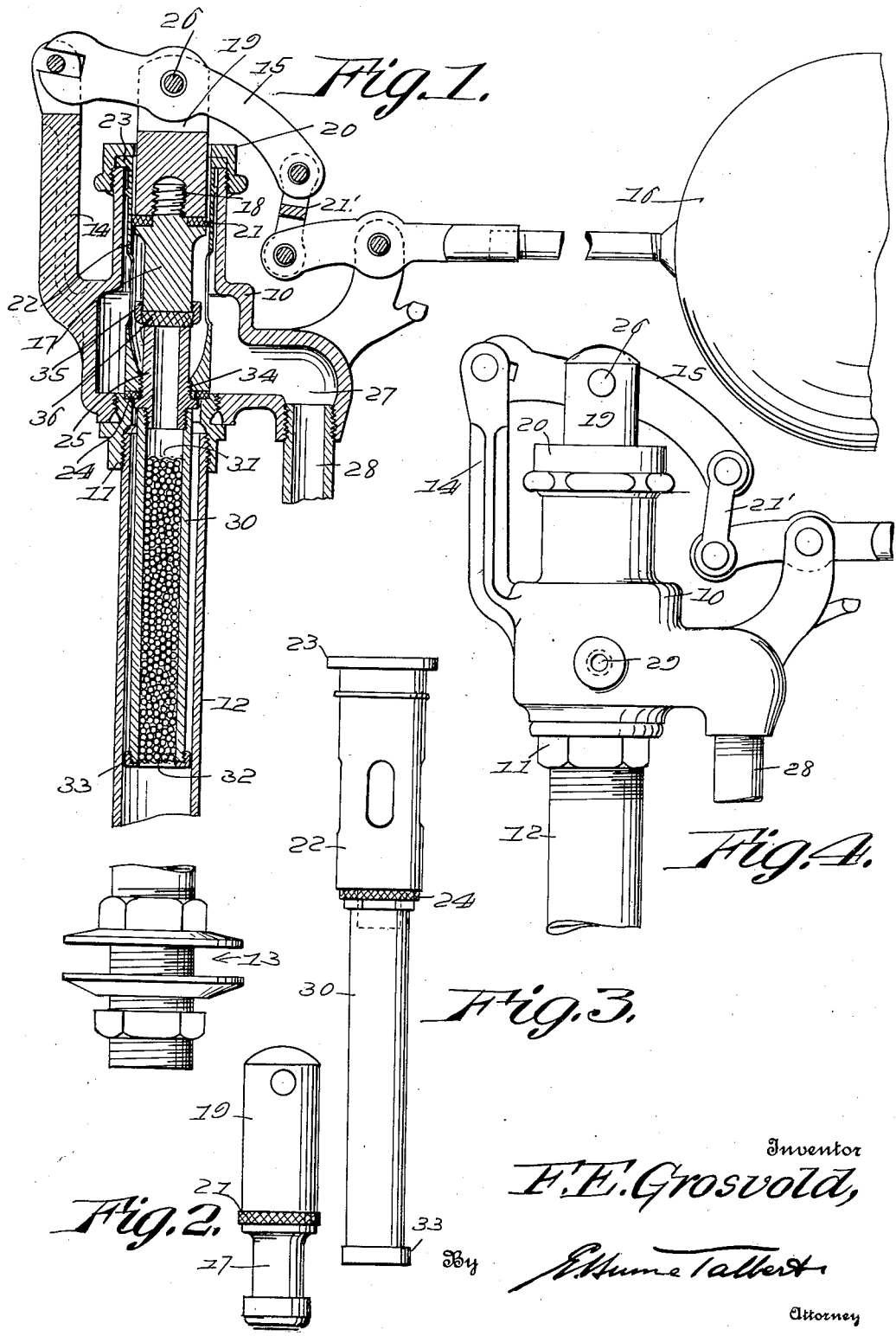
Inventor
F. E. Grosvold,
By
Attorney

UNITED STATES PATENT OFFICE.

FRED E. GROSVOLD, OF EAU CLAIRE, WISCONSIN.

BALL-VALVE FOR CLOSET-TANKS.

1,377,883. Specification of Letters Patent. Patented May 10, 1921.

Application filed June 3, 1919. Serial No. 301,444.

*To all whom it may concern:*

Be it known that I, FRED E. GROSVOLD, citizen of the United States of America, residing at Eau Claire, in the county of Eau Claire and State of Wisconsin, have invented new and useful Improvements in Ball-Valves for Closet-Tanks, of which the following is a specification.

The object of the invention is to provide for use in connection with closet tanks a valve of the float or ball type wherein the operation in refilling the tank may be accomplished silently or with a minimum sound of the entering water which is discharged by the valve into the tank, and also to provide a construction of valve in which its operating elements may be readily removed from the upper end of the valve casing and above the level of the contents of the tank with which it is related, without disturbing the connection of the valve casing or water inlet pipe to the tank.

Further objects and advantages of the invention will appear hereinafter, in the course of a detailed description of a preferred embodiment thereof, it being understood that changes in form, proportions and details may be resorted to within the scope of the appended claims, without departing from the principles involved.

In the drawings:—

Figure 1 is a sectional view of the improved valve.

Fig. 2 is a detail view of the valve proper and stem.

Fig. 3 is a similar view of the valve cage and silencer.

Fig. 4 is a side elevational view of the valve *per se*.

In the construction shown the valve casing 10 is connected by means of a thimble 11 with the supply pipe 12 having the usual or any preferred fittings 13 for engagement with the bottom of the tank in connection with which the apparatus is employed, and mounted upon an arm or bracket 14 of the casing is the lever 15 actuated by the float or ball 16 for controlling the position of the valve 17. This valve is jointed as at 18 to a plug or stem 19 extending through a cap 20 which is removably fitted upon the upper end of the casing, suitable packing 21 being employed at the joint between the valve and stem or plug to avoid leakage at the top of the casing by operating snugly in the valve cage 22 which extends to the upper end of the casing and is provided with a supporting or bearing flange 23 which is engaged by the casing cap 20.

Said cage at its lower end rests upon a shoulder formed by the upper end of the thimble 11, an interposed gasket 24 being employed at this point, while threaded in the lower end of the cage is the valve seat tube 25, removable with the cage after the cap 20 has been displaced, said cage being throughout of an exterior diameter less than the interior diameter of the casing so as to permit of such removal. In the same way the valve and plug or stem 19 are of a diameter adapting them to be removed from the cage and hence from the casing upon the removal of the pivot pin 26 by which the lever 15 is connected with the valve stem. With the outlet 27 of the casing there is connected the usual delivery tube 28, and communicating with the interior of the casing around the cage is a tapped opening 29 for a refill tube.

Detachably engaged with the lower end of the valve seat tube and hence carried by the valve cage is the silencer which consists of a tube 30 provided with a filling of shot or other similar granular material held in place in the tube by means of upper and lower screens 31 and 32, the lower screen in turn being secured in place by means of a cap ring 33 which is removable for the purpose of liberating the granular filler for cleaning purposes.

This silencer being disposed in the path of inflow of water from the feed to the casing serves to obstruct or impede without stopping the flow, so as to insure the discharge of the water into the tank without the objectionable noise which is common in the usual practice and with the ordinary construction of devices of this type and for this purpose and the diameter of the tube or receptacle in which the filler is arranged is such as to pass through the bearing provided for the valve cage, so that upon the removal of the cap nut 20 the cage valve seat and silencer may be withdrawn bodily through the upper end of the casing of the valve as indicated in Fig. 3. After such bodily removal the valve seat may be disconnected from the valve cage by unscrewing the same at the joint 34, or the tube of the silencer may be disconnected from the lower end of the valve seat with which it is connected by a threaded joint, so that access may be readily had to any other parts for the purpose of repairing or cleansing the same. The valve may be fitted as in the usual practice at its lower end with a cap nut 35 holding in place a packing 36 for contact with the valve seat which is represented by the upper end of the tube 25.

Thus in addition to the advantages incident to the practical silencing of the inflow of water to the tank by the means suggested, the removal of the working parts of the valve is possible through the upper end of the casing merely by disconnecting the valve operating lever 15 from the valve by withdrawing the pin 26, and by removing the cap nut 20 which constitutes the closure for the upper end of the casing, the detachment of the several coöperating parts being thereafter possible to give access thereto individually for necessary repair, regrinding, cleansing, replacement and the like.

Claimed:

1. A ball cock for flush tanks having a casing provided at its upper end with a removable cap nut, a valve cage removable through the upper end of the casing and having a flange at its upper end for engagement by said cap nut, a valve seat arranged within and detachably secured to the valve cage, and a valve located within the cage and having its stem fitted to operate in the opening of said cap nut.

2. A ball cock for flush tanks having its casing provided at its upper end with a removable cap nut, a valve cage removable through the upper end of the casing and provided with a flange for engagement by said cap nut, a valve seat tube arranged within and detachably connected with said cage, and a silencer having a tube detachably connected with the lower end of the valve seat tube and of a diameter not exceeding that of the cage for removal therewith through the upper end of the valve casing.

3. A ball cock for flush tanks having a casing provided at its upper end with a removable cap nut, a valve cage removable through the upper end of the casing and provided with a flange for engagement by said cap nut, a valve seat tube arranged within the cage and detachably engaged adjacent to its lower end with the lower end of the cage, a silencer having a tube detachably engaged with the lower extremity of the valve seat tube and of a diameter not exceeding that of said cage, and a valve arranged within the cage and having a stem operating in the opening of the said cap nut of the casing.

4. A valve for flush tanks having a casing adapted for attachment to the inlet pipe, and a silencer consisting of a tube depending from the casing at the inlet end for disposition in the inlet pipe, the said tube being provided with spaced screens and a granular filler disposed between the same.

In testimony whereof I affix my signature.

FRED E. GROSVOLD.